United States Patent [19]

Griffiths

[11] Patent Number: 4,567,335
[45] Date of Patent: Jan. 28, 1986

[54] HIGH SPEED TROLLEY HARP ASSEMBLY

[75] Inventor: Thomas W. Griffiths, Lexington, Ohio

[73] Assignee: Harvey Hubbell Incorporated, Orange, Conn.

[21] Appl. No.: 626,715

[22] Filed: Jul. 2, 1984

[51] Int. Cl.4 .............................................. B60L 5/08
[52] U.S. Cl. .................................. 191/59.1; 191/60.3; 191/60.5
[58] Field of Search ....................... 191/59, 59.1, 60.3, 191/60.5, 64

[56] References Cited

U.S. PATENT DOCUMENTS

| | | | |
|---|---|---|---|
| 1,028,189 | 6/1912 | Coleman | 191/60.3 |
| 1,393,939 | 10/1921 | Blaney et al. | 191/60.3 |
| 1,424,717 | 8/1922 | Dorrance | 191/60.5 X |
| 1,448,474 | 3/1923 | Vollmuth | 191/60.3 |
| 1,777,955 | 10/1930 | Blackhall | 191/60.5 X |
| 1,786,719 | 12/1930 | Dippman et al. | 191/64 |
| 1,893,373 | 1/1933 | Matthes | 191/64 X |
| 2,426,150 | 8/1947 | Larsson | 191/60.3 |
| 4,225,023 | 9/1980 | Bautz | 191/59.1 |

FOREIGN PATENT DOCUMENTS 2320204  3/1977  France ............................... 191/59.1

Primary Examiner—Robert B. Reeves
Assistant Examiner—David F. Hubbuch
Attorney, Agent, or Firm—Jerry M. Presson; Walter C. Farley

[57] ABSTRACT

A high speed trolley harp assembly includes a rotatable portion at the upper end of a trolley pole with a shoe assembly held on a support structure which is pivotally connected to a lower body at the upper end of the pole. Elastomeric, resilient support cushions are held in the lower body protruding therefrom and contact the support structure to provide a cushioning effect to absorb shock, vibration and noise occurring at high speeds when the shoe assembly rides along an overhead conductor.

7 Claims, 5 Drawing Figures

HIGH SPEED TROLLEY HARP ASSEMBLY

SPECIFICATION

This invention relates to trolley current collectors and, more specifically, to an improved current collector for use at high speeds.

BACKGROUND OF THE INVENTION

Current collectors for vehicles powered from overhead wires have evolved over many years with various improvements to overcome problems involving ease of use, maintenance of electrical contact between the current collecting shoe and the overhead conductor and handling of the stresses imposed on the system under various operating conditions.

As the speed requirements of the electrically powered vehicle increase, vibration and noise problems have become more severe, and the devices which were useful under operating circumstances of some years ago are no longer satisfactory. An important factor is the fundamental condition that the electrical conductor is not rigid. Rather, it is a wire, or a set of wires, which can flex and move within certain limits. Although the wire is braced and restrained in various ways, it can nevertheless oscillate and undergo complex sets of vibrations and other movements.

Thus, although there have been many prior efforts at vibration solutions including springs and other mechanical devices, they have not been entirely satisfactory. Some are too complex and expensive some are simply too difficult to maintain in order to be practical in the field. Examples can be found in the following documents.

| Vollmuth | 1,448,474 | Seidl et al | 4,205,736 |
|---|---|---|---|
| Larsson | 2,044,886 | Bautz | 4,225,023 |
| Larsson | 2,426,150 | German | OS 2,753,932 |
| Delachaux | 2,480,912 | German | OS 2,752,992 |
| Adler et al | 4,116,312 | | |

BRIEF DESCRIPTION OF THE INVENTION

An object of the present invention is to provide a current collector of the type commonly referred to as a trolley harp which has improved characteristics for absorbing vibrations and maintaining contact with the elongated conductor under high speed conditions.

A further object is to provide a trolley harp assembly of this general type which is reliable and simple to maintain and which is not excessively expensive.

Briefly described, the invention includes an improved high speed trolley harp assembly for use at the upper end of a trolley pole to maintain a current collecting shoe in contact with an elongated conductor and comprising the combination of an upper body attached to the upper end of the pole, the body including a generally tubular sleeve and a central wall protruding therefrom. A current shoe having a longitudinal recess for contacting a conductor is mounted on support means which is pivotally attached to the central wall protruding from the tubular sleeve so that the support means is pivotal relative to the upper body about an axis which is generally perpendicular to the longitudinal recess in the shoe. A body of compressible elastomeric material is contained in the upper body and protrudes therefrom adjacent the central wall so as to contact a surface of the support means to assist in maintaining the shoe in contact with the conductor and to absorb vibrational energy of the support means as the shoe moves along the conductor.

In a preferred embodiment, two bodies of compressible elastomeric material are used, one on each side of the central wall. Further, each of the bodies is generally rectangular in shape but has a transverse central hole perpendicular to the plane of the central wall to improve the resiliency characteristics thereof for this purpose.

In order that the manner in which the foregoing and other objects are attained in accordance with the invention can be understood in detail, a particularly advantageous embodiment thereof will be described with reference to the accompanying drawings, which form a part of this specification, and wherein.

DETAILED DESCRIPTION OF A PREFERRED EMBODIMENT

Figure 1:
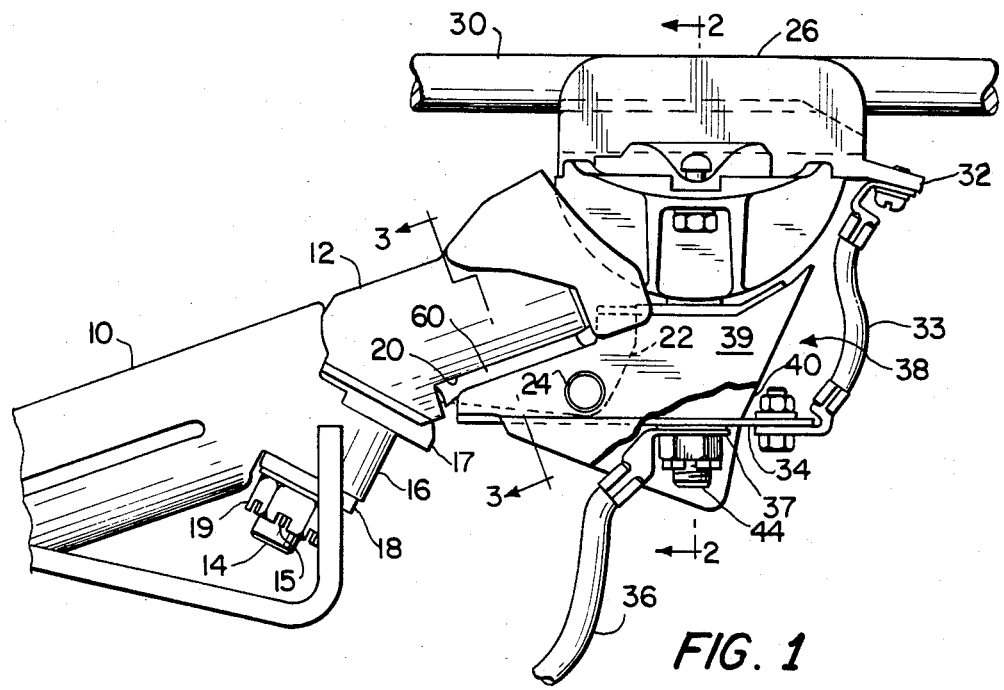
FIG. 1 is a partial side elevation of the upper end of a trolley pole with a trolley harp in accordance with the invention mounted thereon.
Figure 2:
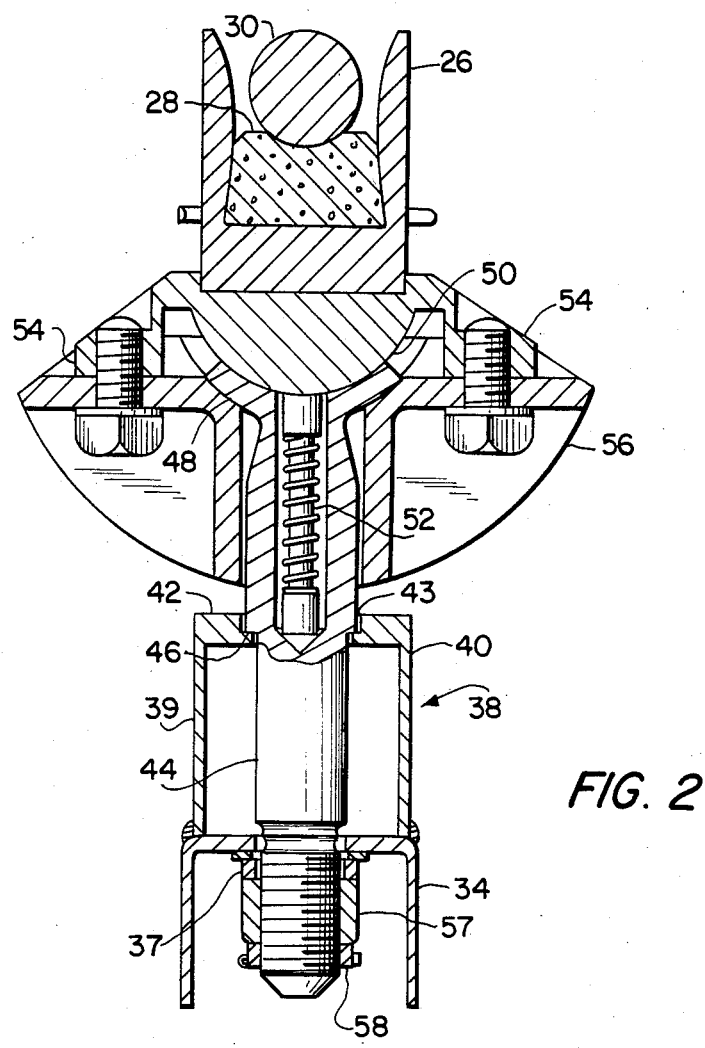
FIG. 2 is a transverse sectional view along line 2—2 of FIG. 1.

Referring first to FIGS. 1 and 2, it will be seen that the assembly is coupled to the upper end of a trolley pole and includes a generally tubular lower body 10 and a generally tubular upper body 12, body 12 having a threaded stud 14 fixedly attached thereto. The central longitudinal axes of bodies 10 and 12 can be aligned, as illustrated, but upper body 12 is arranged to pivot relative to body 10 about the axis of stud 14 which passes through a partially cylindrical portion 16 of body 10 which contains a low friction bushing, not illustrated. Non-metallic washers 17 and 18 are mounted at the upper and lower ends of portion 16, this assembly being held in place by a castle nut 19 which is threaded onto stud 14 and held in place by a conventional cotter pin 15 or the like. Washers 17 and 18 are preferably made of low friction nylon or other low friction polymer to minimize frictional resistance to pivoting movement about the axis of stud 14.

Figure 3:
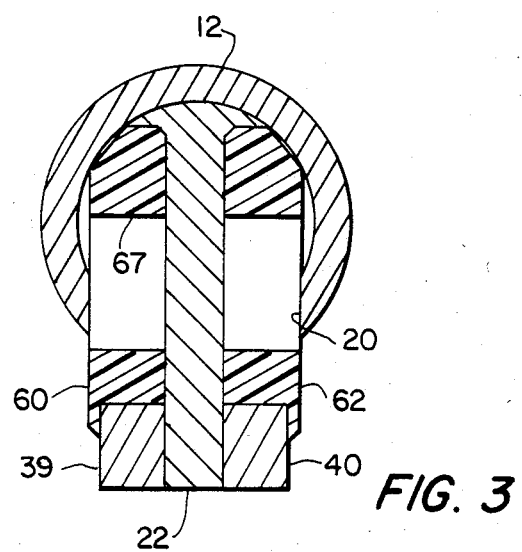
FIG. 3 is an inclined sectional view along line 3—3 of FIG. 1.

The lower portion of tubular body 12 is cut away to form an opening 20 through which a central wall 22 protrudes. As best seen in FIG. 3, wall 22 is a relatively thick, rigid member which is fixedly attached within body 12 and extends downwardly and rearwardly thereof, a substantial portion of the wall protruding beyond opening 20 and beyond the rear end of body 12. A pivot pin 24 extends through wall 22 and through a support structure 38 for the current collecting shoe.

A shoe assembly 26, which is generally U-shaped in transverse section as seen in FIG. 2, contains a body of carbon or other suitable material 28 which is held therein to ride along a conductor 30 and make good electrical contact therewith for conveying current from the conductor through the trolley pole or associated cable and to the vehicle. The shoe assembly has a tang 32 at the rear end thereof which is attached to a cable 33, the other end of which is connected to a shoe restraint member 34. A shunt cable 36 is connected to a pin 44 and carries current to the pole or associated cable. A support assembly indicated generally at 38 includes substantially parallel plate-like walls 39 and 40 which are joined at the top by a transverse plate 42, forming a structure which is generally U-shaped and opening downwardly as shown in FIG. 2, the lower edges thereof being welded to member 34. Toward the forward portion of support assembly 38, walls 39 and 40 are substantially thicker and lie on opposite sides of wall 22 as illustrated in FIG. 3. Pin 24 passes through walls 39, 22 and 40, pivotally connecting support assembly 38 to wall 22.

A socket pin 44 extends vertically through restraint member 34 and the transverse wall 42 of support assembly 38, pin 44 being formed with a shoulder 46 which rests on an annular shoulder around an opening 43 through wall 42. At the upper end of pin 44 is a cup-shaped, spherical support member 48 which receives a hemispherical body 50, body 50 being directly beneath and firmly, but removably, attached to shoe assembly 26. Body 50 can thus slide in the upwardly facing concave surface of body 48, body 50 being connected by a spring loaded flexible cable assembly 52 to socket pin 44 to provide a current conducting path so that the contact between bodies 48 and 50 can be lubricated and need not be relied upon for high current conduction. Body 50 is provided with outwardly extending flanges 54 which are connected to a surrounding and downwardly extending enclosing member 56 which engages the lower surface of body 48 to keep body 50 in good contact therewith.

At the lower end of pin 44, the connector 37 for shunt cable 36 is firmly attached by a castle nut 57 and cotter pin 58 to prevent disengagement.

As will be recognized, the support structure permits limited rotational movement about the generally vertical axis of pin 44 as well as tilting movement permitted by the engagement of spherically surfaced bodies 48 and 50 to follow variations in the direction of conductor 30 and also to maintain contact when the support assembly moves laterally to one side of conductor 30 or the other. Rotation is limited only by cable 33.

Still further, the support assembly and the shoe assembly mounted thereon are capable of pivotal movement about the horizontal axis of pin 24, and it is about this axis that many of the vibration problems occur. Accordingly, a cushion arrangement including cushion members 60 and 62 is provided between the walls 39 and 40 of support assembly 38 and the interior of body 12. Cushions 60 and 62 lie on opposite sides of wall 22 and, as shown in FIG. 3 and to a lesser extent in FIG. 1, cushions 60 and 62 are elastically compressed to some degree with the support assembly in the normal position illustrated.

Figure 4:
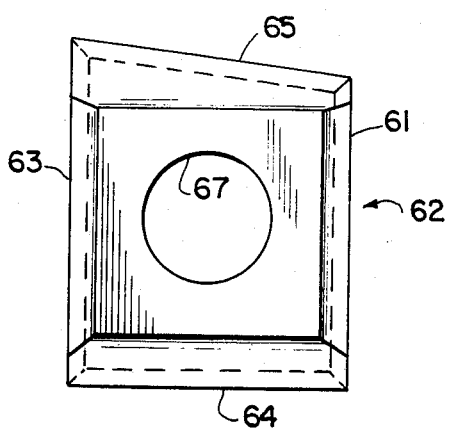
FIG. 4 is a side elevation of an elastomeric body usable in the assembly of FIGS. 1-3.
Figure 5:
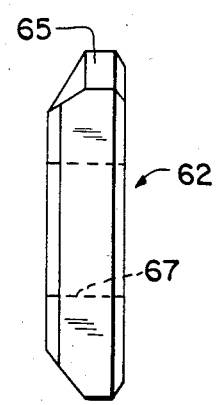
FIG. 5 is an end elevation of the body of FIG. 4.

Cushions 60 and 62 are substantially identical, but are mirror images of each other. Cushion 62 is illustrated in FIGS. 4 and 5 and includes a generally rectangular body of neoprene rubber or similar material having a durometer hardness of between about 40 and 70 but, preferably, between about 55 and 65. The body includes parallel back and front edges 61 and 63 and top and bottom edges 64 and 65. When installed, edge 64 is uppermost, edge 65 being against wall 40 as seen in FIG. 3. Inclined edge 64 extends along the upper, inner surface of body 12. The edges are suitably inclined to generally conform to the interior curvature of body 12 and the tapered attachment of wall 22 to the interior of the body.

A central opening 67 penetrates the cushion body along an axis which is generally perpendicular to the plane containing the trolley pole and, in the centered position, conductor 30. Opening 67 modifies the resilience characteristics of the cushion so that it is capable of deforming when the support assembly 38 is pivoted in a clockwise direction to absorb the forces and vibrations involved, but still permits the material of the body to be relatively stiff and hard so that it can respond by quickly expanding when assembly 38 is moved counterclockwise. In the embodiment shown, opening 67 has a diameter which is approximately equal to one-half of the distance between front and back edges 61 and 63. However, it is possible to modify the size and shape of the opening from this particular relationship if the durometer characteristics of the body are also modified to compensate for the change. As will be recognized by referring again to FIG. 3, providing opening 67 in each cushion also permits each cushion to be dimensioned so that it substantially fully occupies its chamber on one side of wall 22 within body 12 in a substantially uncompressed condition.

While one advantageous embodiment has been chosen to illustrate the invention, it will be understood by those skilled in the art that various changes and modifications can be made therein without departing from the scope of the invention as defined in the appended claims.

What is claimed is:

1. A high speed trolley harp assembly for use at the upper end of a trolley pole to maintain a current shoe in contact with an elongated conductor comprising the combination of an upper body attached to the upper end of said pole, said body including a generally tubular sleeve and a central wall protruding therefrom;

a current shoe having a longitudinal recess for contacting a conductor;

support means for supporting said current shoe;

axle means for pivotally connecting said support means to said central wall so that said support means is pivotable relative to said upper body about an axis generally perpendicular to said central wall; and a body of compressible elastomeric material contained in and protruding from said upper body adjacent said central wall and contacting a surface of said support means to maintain said shoe in contact with said conductor and absorb vibrational energy of said support means as said shoe moves along said conductor.

2. A trolley harp assembly according to claim 1 and further including a second body of compressible elastomeric material contained in and protruding from said upper body adjacent said central wall, said first and second bodies being on opposite sides of said wall.

3. A trolley harp assembly according to claim 2 wherein said central wall lies on a diameter of said upper body and substantially bisects the interior thereof, and each said body is a generally rectangular body having a central hole passing therethrough generally perpendicular to the plane of said wall.

4. A trolley harp assembly in accordance with claim 3 wherein each said body has a durometer hardness of between about 40 and about 70.

5. A trolley harp assembly in accordance with claim 4 wherein each said body has a durometer hardness of between about 55 and about 65.

6. A trolley harp assembly in accordance with claim 1 wherein said body of elastomeric material has a durometer hardness of between about 40 and about 70.

7. A trolley harp assembly according to claim 6 wherein said body has a durometer hardness of between about 55 and about 65.

* * * * *